United States Patent [19]

Gausepohl et al.

[11] 4,200,702
[45] Apr. 29, 1980

[54] SELF-EXTINGUISHING THERMOPLASTIC MOLDING COMPOSITIONS

[75] Inventors: Hermann Gausepohl, Mutterstadt; Herbert Naarmann, Wattenheim; Klaus Penzien, Frankenthal; Rudolf Stephan, Ludwigshafen, all of Fed. Rep. of Germany

[73] Assignee: BASF Aktiengesellschaft, Fed. Rep. of Germany

[21] Appl. No.: 912,358

[22] Filed: Jun. 5, 1978

[30] Foreign Application Priority Data

Jun. 18, 1977 [DE] Fed. Rep. of Germany ....... 2727483

[51] Int. Cl.$^2$ .............................................. C08L 51/00
[52] U.S. Cl. ............................... 525/72; 260/45.7 R; 525/86
[58] Field of Search ........................ 260/876 R, 45.7 R

[56] References Cited

U.S. PATENT DOCUMENTS

| | | | |
|---|---|---|---|
| 3,075,944 | 1/1963 | Wick et al. | 260/45.75 R |
| 3,830,766 | 8/1974 | Praetzel et al. | 260/28.5 B |
| 3,943,195 | 3/1976 | Naarmann et al. | 260/874 |
| 3,962,164 | 6/1976 | Praetzel et al. | 260/28.5 B |
| 4,107,231 | 8/1978 | Wurmb et al. | 260/873 |
| 4,137,212 | 1/1979 | Theysohn | 260/857 L |

FOREIGN PATENT DOCUMENTS

| | | |
|---|---|---|
| 1123823 | 9/1962 | Fed. Rep. of Germany . |
| 2046795 | 3/1972 | Fed. Rep. of Germany . |
| 2328535 | 12/1973 | Fed. Rep. of Germany . |
| 2358855 | 6/1975 | Fed. Rep. of Germany . |
| 2515473 | 10/1976 | Fed. Rep. of Germany . |
| 1101025 | 9/1955 | France . |
| 874006 | 8/1961 | United Kingdom . |
| 1345211 | 1/1974 | United Kingdom . |
| 1412517 | 11/1975 | United Kingdom . |
| 1416585 | 12/1975 | United Kingdom . |

*Primary Examiner*—Paul Lieberman
*Attorney, Agent, or Firm*—Keil & Witherspoon

[57] ABSTRACT

Thermoplastic molding compositions based on rubber-modified styrene-acrylonitrile copolymers containing a halogenated styrene oligomer as the effective flameproofing agent which is sufficiently heat-stable, does not interfere with processing on conventional machinery, does not corrode or cause coatings on such machinery, and has virtually no adverse effect on the impact strength of the polymers. The flameproofing agent as a rule has a degree of polymerization of from 3 to 200 and can be incorporated into the polymer by conventional methods; the polymer may or may not contain additional synergistic agents and processing auxiliaries, which are incorporated in the conventional manner and in the conventional amounts.

3 Claims, No Drawings

SELF-EXTINGUISHING THERMOPLASTIC MOLDING COMPOSITIONS

The present invention relates to thermoplastic molding compositions based on rubber-modified styrene-acrylonitrile copolymers, which compositions are flameproofed with an organic halogen compound.

Rubber-modified styrene-acylonitrile copolymer mixtures have been disclosed. They are generally manufactured by a graft copolymerization of styrene and acrylonitrile in the presence of a rubber, with or without subsequent mixing of this graft product with a separately produced hard component consisting of a styrene-acrylonitrile copolymer. Depending on whether the rubber used in the manufacture of these molding compositions is a butadiene polymer, an elastomeric acrylic ester polymer or an ethylene-propylene rubber, the molding compositions are also referred to as ABS, ASA or AES polymers. It is known that these rubber-modified styrene-acrylonitrile polymers combine valuable mechanical properties, in particular great toughness, with good chemical resistance. If a saturated rubber has been used for their manufacture, the products are also resistant to weathering and aging. This good combination of properties allows them to be used for the manufacture of technical housing components, eletrical switch components, kitchen appliances, automotive components and the like. For numerous applications, however, it is necessary that the molding compositions should, after brief exposure to a flame, be self-extinguishing and non-dripping.

The flameproofing of styrene polymers with organic halogen compounds has also been disclosed long ago. Attempts to reduce the flammability of rubber-modified styrene-acrylonitrile copolymers of the ABS, ASA or AES type by adding the conventional halogen-containing flameproofing agents usually employed for polystyrene have hitherto had little success. Thus, German Pat. No. 1,123,823 describes brominated diphenyls or diphenyl ethers as flameproofing agents for polystyrene, these bromine compounds being used, especially, as synergistic agents in combination with antimony trioxide. German Laid-Open Application DOS No. 2,358,855 discloses the use of brominated oligomers or polymers of dialkylbenzenes, trialkylbenzenes or tetraalkylbenzenes as lameproofing agents for styrene polymers or olefin polymers. If these conventional flameproofing agents are used for flameproofing rubber-modified styrene-acrylonitrile copolymers, as described, for example, in German Laid-Open Application DOS No. 2,046,795 where halogenated diphenyls and diphenyl ethers are used to flameproof ABS polymers, molding compositions which are self-extinguishing within a sufficiently short time are obtained. However, it is found that when such compositions are stored for lengthy periods at room temperature or under warm conditions, a white coating forms, attributable to migration of the flameproofing agent or of certain constituents of the flameproofing agent. This formation of a coating on the polymers, which would be unacceptable even on visual grounds, not only affects the flame repellency but also detracts from the electrical insulating properties of the polymers.

In addition to the requirement that the flameproofing agent should not migrate or sweat out, flameproofing agents for rubber-modified styrene-acrylonitrile copolymers also have to meet important requirements in respect of the processing characteristics on extruders or injection molding machines. In particular, sufficient heat stability and adequate flow at from 200° to 280° C. are required. The flameproofing agents must neither corrode the processing machines nor produce a coating thereon. German Laid-Open Application DOS No. 2,328,535 discloses ABS polymers of low flammability which contain, as flameproofing agents, certain halogenated bis-phenoxy-alkanes or bis-thiophenyl-alkanes and which substantially meet the above requirements in respect of flame resistance, stability to migration and heat stability of the flameproofing agent and in respect of good mechanical properties of the molding compositions. The halogenated bis-phenoxy-alkanes or bis-thiophenyl-alkanes employed, according to German Laid-Open Application DOS No. 2,328,535, as flameproofing agents for the ABS polymers must however be manufactured by a relatively expensive process. Furthermore, it has been found that the flameproofed ABS polymers described in German Laid-Open Application DOS No. 2,328,535 are still not always entirely satisfactory in respect of their properties.

It is an object of the present invention to provide a flameproofing agent for rubber-modified styrene-acrylonitrile copolymers which does not suffer from the above disadvantages. The flameproofing agent should be obtainable by an economical and simple method and should, in particular, provide a very high degree of flameproofing in the rubber-modified sytrene-acrylonitrile copolymers even when used in very small amounts. At the same time, the rubber-modified styrene-acrylonitrile copolymers flameproofed with the said agent should exhibit good processability on conventional machinery, without causing corrosion of forming coatings; in addition, the flameproofing agent should not migrate out of the finished molding and should not adversely affect, or at least not substantially detract from, the mechanical properties of the rubber-modified styrene-acrylonitrile copolymers, especially their impact strength, so that flameproofed finished articles with good mechanical properties can be obtained, which are superior in their properties to the conventional flameproofed rubber-modified styrene-acrylonitrile copolymers.

We have found that this object is achieved by using halogenated styrene oligomers as flameproofing agents for the rubber-modified styrene-acrylonitrile copolymers.

Accordingly, the present invention relates to a thermoplastic molding composition comprising
(A) from 6 to 100 percent by weight, based on (A+B), of a graft product manufactured by graft polymerization of
  1. from 10 to 95 percent by weight, based on (A), of a mixture of styrene and acrylonitrile or an alkyl derivative thereof in the weight ratio of from 90:10 to 60:40, in the presence of
  2. from 90 to 5 percent by weight, based on (A), of a rubbery polymer having a glass transition temperature of below 0° C.,
(B) from 0 to 94 percent by weight, based on (A+B), of a copolymer of styrene and acrylonitrile or an alkyl derivative thereof in the weight ratio of from 90:10 to 60:40, the content of the rubbery polymer (A 2) in the molding composition being from 5 to 40 percent by weight based on the sum of (A+B), (C) an effective amount of an organic halogen compound to act as a flameproofing agent, with or without (D) further additives, wherein the flameproofing agent (C) consists of halogenated styrene oligomers.

The halogenated sytrene oligomers are known per se and can, according to German Laid-Open Application DOS No. 2,515,473, be used in particular for flameproofing polyesters. It has now been found, surprisingly, that the halogenated styrene oligomers are equally outstandingly suitable for flameproofing rubber-modified styrene-acrylonitrile polymers, and that their use avoids the disadvantages mentioned earlier and gives products with improved properties, compared to the prior art. This was in no way foreseeable or to be expected since, as disclosed, for example, in German Laid-Open Applications DOS No. 2,046,795 and DOS No. 2,328,535, halogen-containing flameproofing agents which are used in other plastic systems usually cannot be employed—at least not directly and with the same success—for rubber-modified styrene-acrylonitrile copolymers.

All customary conventional rubber-modified styrene-acrylonitrile copolymers of the ABS, ASA or AES type can be employed for the purposes of the present invention. They are polymers or polymer mixtures which are obtained by graft polymerization of a mixture of styrene and acrylonitrile and/or their alkyl derivatives in the presence of a rubber having a glass transition temperature below 0° C., preferably below =20° C. and especially below −40° C., with or without subsequent mixing of these graft products with a separately produced copolymer of styrene and acrylonitrile and/or their alkyl derivatives. The glass transition temperature of the rubber employed can be determined by the methods described in B. Vollmer, Grundriss der makromolekularen Chemie, pages 406–410, Springer-Verlag, Heidelberg (1962).

Examples of suitable rubbers for the manufacture of the graft product (component A) are diene-based polymers. These include, in particular, the homopolymers of butadiene, isoprene and 2,3-dimethylbutadiene. Copolymers of these dienes with one another or with other copolymerizable monomers, e.g. styrene or acrylonitrile, can also be employed, but the content of these other copolymerizable monomers in the diene polymers in general does not exceed 30 percent by weight. Polymers of from 20 to 80 percent by weight, preferably from 30 to 70 percent by weight, of butadiene and from 80 to 20 percent by weight, preferably from 70 to 30 percent by weight, of an alkyl acrylate, where alkyl is of 1 to 8 carbon atoms, preferably n-butyl acrylate, may also be used as rubbers. These butadiene-acrylate esters copolymers may again contain up to 30 percent by weight of other copolymerizable monomers, e.g. isoprene, styrene, acrylonitrile or vinyl alkyl ethers, as copolymerized units. A further group of rubbers which may be used for the manufacture of the graft product (component A) are the polymers of alkyl acrylates, where alkyl is of 1 to 8 carbon atoms. Examples which may be mentioned are poly(ethyl acrylate), poly(ethylhexyl) acrylate) and especially poly(n-butyl acrylate). It is particularly advantageous to crosslink the polyacrylates by copolymerizaton of from 1 to 5 percent by weight of a compound with at least two non-conjugated olefinic double bonds. A further group of rubbers are the EPDM rubbers which are obtained by terpolymerization of ethylene, propylene and a diene with two non-conjugated olefinic double bonds.

To manufacture the graft product (component A), a monomer mixture of styrene and acrylonitrile in the weight ratio of from 90:10 to 60:40, preferably from 75:25 to 65:35, is polymerized in the presence of the rubber, resulting in at least a part of the monomers being grafted onto the rubber. The styrene and/or the acrylonitrile in the monomer mixture can be entirely or partially replaced by the corresponding alkyl derivatives of these compounds, e.g. α-methylstyrene and methacrylonitrile. The graft polymerization of the monomer mixture of styrene and acrylonitrile and/or their alkyl derivatives in the presence of the rubber can be carried out in the usual conventional manner in solution, in suspension or preferably in an aqueous emulsion which contains the dispersed pre-formed rubber, using the conventional catalysts and in the presence of the conventional polymerization auxiliaries, e.g. emulsifiers or suspending agents, molecular weight regulators and buffers. Preferably, graft products (component A) which have been obtained by emulsion graft polymerization, as described, for example, in German Pat. Nos. 1,260,135 and 1,238,207 for the manufacture of ABS and ASA polymers, are employed in the molding compositions according to the invention.

In general, the graft product (component A) is manufactured by polymerizing from 10 to 95 percent by weight of the monomer mixture of styrene and acrylonitrile and/or their alkyl derivatives in the presence of from 90 to 5 percent by weight of the rubber which serves as the graft base. Depending on the rubber content of the graft product (component A), the latter may be mixed with a separately produced styrene-acrylonitrile copolymer (component B) in an amount of up to 94 percent by weight, based on the sum of components A and B, and in this copolymer the styrene and/or acrylonitrile can be entirely or partially replaced by the corresponding alkyl derivatives. Components A and B must be selected so that the content of the rubber, which serves as the graft base, in the molding compositions according to the invention is from 5 to 40 percent by weight, based on the sum of (A+B). The free copolymer (component B) is prepared in the usual conventional manner by polymerizing a monomer mixture of styrene and acrylonitrile in the weight ratio of from 90:10 to 60:40, preferably from 75:25 to 65:35, by mass polymerization, solution polymerization or aqueous dispersion polymerization; the styrene and/or the acrylonitrile can be entirely or partially replaced by the alkyl derivatives of these compounds, e.g. α-methylstyrene and methacrylonitrile. The free copolymer (component B) can be mixed with the graft product (component A) in the usual conventional manner, e.g. by coextrusion, cokneading or milling the two components together.

Preferably, the molding compositions according to the invention contain, as the component A, from 20 to 50 percent by weight, based on (A+B), of a graft product which has been produced by emulsion graft copolymerization of from 20 to 50 percent by weight, based on graft product A, of a monomer mixture of styrene and acrylonitrile or their alkyl derivatives, in the presence of from 80 to 50 percent by weight, based on graft product A, of a rubbery polymer of the above type, also prepared by emulsion polymerization, which serves as the graft base, whilst as component B the compositions according to the invention preferably contain from 80 to 50 percent by weight, based on (A+B), of a separately produced copolymer of styrene and acrylonitrile and/or their alkyl derivatives, in the above weight ratios.

According to the invention a halogenated styrene oligomer is employed as the flameproofing agent (component C) for the rubber-modified styrene-acrylonitrile copolymers obtained from components A and B. For the purposes of the present invention, styrene oligomers means both oligomers of styrene itself and oligomers of nuclear-alkylated and side chain-alkylated styrenes. In particular, the homo-oligomers of styrene and of nuclear-alkylated styrenes can be used. Suitable nuclear-alkylated styrenes are, in this context, especially those which contain one or more unbranched alkyl groups attached to a nuclear carbon atom, e.g. vinyltoluene, vinylethylbenzene and vinylpropylbenzene. The co-oligomers of styrene with α-methylstyrene and/or with the nuclear-alkylated styrenes may also be used in the same way as the homooligomers. However, the use of styrene homo-oligomers is preferred.

The halogenated styrene oligomers to be used according to the invention, are, in general, the chlorinated and/or brominated styrene oligomers, amongst which the latter are preferred. It has proved particularly advantageous to use the nuclear-halogenated, heat-stable styrene oligomers of the general formula I

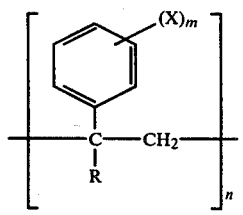

(I)

where X is halogen, especially chlorine and/or bromine, R is hydrogen or an aliphatic radical, especially hydrogen or alkyl, e.g. $CH_3$ or $C_2H_5$, m is a number from 1 to 5, preferably from 2 to 4, and n is the degree of polymerization of the styrene oligomer. Amongst the halogen substituents X, bromine is particularly preferred; R is preferably hydrogen.

The nuclear-halogenated, heat-stable styrene oligomers of the general formula (I) can be manufactured in accordance with conventional processes, for example by polymerizing suitable brominated styrenes. They are obtained particularly advantageously by the process described in German Laid-Open Application DOS No. 2,537,385, according to which the styrene oligomers obtained, for example, by thermal oligomerization of styrene are first selectively hydrogenated and the resulting products are then brominated in a halogenated solvent in the presence of a Lewis acid as the catalyst, at below 20° C. After quantitatively removing the catalyst and the solvent, products containing from 40 to 80 percent by weight of bromine are obtained, which do not decompose even at from 240° to 340° C.

Further suitable flameproofing agents (component C) according to the present invention are correspondingly prepared bromination products of non-hydrogenated styrene oligomers. Though their heat stability is somewhat lower than that of the products obtained from the selectively hydrogenated styrene oligomers, it is still sufficiently high to permit processing of the rubber-modified styrene-acrylonitrile copolymers. The brominated styrene oligomers to be employed according to the invention can also be manufactured in a simple and elegant manner by a one-vessel process directly from styrene and bromine, as described, for example, in German Patent Application No. P 26 51 435.2. According to this method, styrene is first cationically polymerized in solution in the presence of a Lewis acid catalyst and bromine is then added to the reaction solution, with or without first adding a further amount of Lewis acid catalyst.

The brominated styrene oligomers to be employed for the purposes of the invention in general contain from 40 to 80, preferably from 50 to 80, percent by weight of bromine. They are colorless to yellow solids having melting points/softening points of from about 100° C. to 220° C.

The mean degree of polymerization of the halogenated styrene oligomers is usually from 3 to 200. Molding compositions with an optimum combination of properties in respect of flameproof character, non-migration of the flameproofing agent, and flow and process-ability of the molding compositions, as well as mechanical properties of the finished articles prepared therefrom, are obtained when, according to a preferred embodiment of the invention, the mean degree of polymerization of the halogenated styrene oligomers is from 7 to 50, especially from 7 to 30, cyclic oligomers also being suitable. The molecular weight distribution and hence the degree of polymerization of the non-halogenated styrene oligomers substantially or entirely corresponds to that of the halogenated styrene oligomers.

The presence of one or more synergistic flameproofing agents, in addition to the flameproofing agents of the invention, in the rubber-modified styrene-acrylonitrile copolymers is a further advantage. Virtually all conventional synergistic agents for the halogenated styrene oligomers may be used; oxides of metals of group Vb of the periodic table, especially antimony trioxide, are particularly preferred. Antimony trioxide which has been precipitated on a suitable inorganic carrier, e.g. finely divided kaolin, calcined kaolin or talc, is particularly effective.

Where antimony trioxide is added as the synergistic flameproofing agent, its amount is in general from 2 to 10 percent by weight, preferably from 3 to 6 percent by weight, based on components (A+B).

The amount of halogenated styrene oligomer required for flameproofing the rubber-modified styrene-acrylonitrile copolymers depends on the halogen content of the oligomers. The rule is that the halogenated styrene oligomers are employed in an effective amount; it has been found that in general from 5 to 30 percent by weight of the halogenated styrene oligomers, based on components (A+B) is required to prodcue adequate flameproofing. Preferably, the halogenated styrene oligomers are used in amounts of from 10 to 25 percent by weight, based on components (A+B). It is noteworthy that the preferred brominated styrene oligomers having a mean degree of polymerization of from 7 to 50, preferably from 7 to 30, and a bromine content of from 50 to 80 percent by weight, preferably from 55 to 70 percent by weight, can be employed in relatively large amounts without causing migration of the additive or corrosion of the equipment, or detracting from the impact strength of the molding compositions. If brominated styrene oligomers are employed, the bromine content of the molding compositions according to the invention should be from about 2 to about 25 percent by weight, preferably from about 4 to about 20 percent by weight, based on components (A+B).

In addition to the flameproofing agent and the synergistic flameproofing agent, the rubber-modified styrene-acrylonitrile copolymers (components A and B) may contain conventional amounts of other additives, e.g. conventional processing auxiliaries, antistatic agents, antioxidants, yellowing stabilizers, heat stabilizers, colored pigments and/or fillers, e.g. glass fibers or glass beads.

The halogenated styrene oligomers, with or without the synergistic agent and the further additives, may be incorporated into the rubber-modified styrene-acrylonitrile copolymer by any suitable conventional mixing process. For example, this may be done on a mill, in an extruder or in a kneader, in the conventional manner, preferably by adding the above ingredients to the polymer melt. The molding compositions according to the invention can be processed by, for example, injection molding, extrusion or sintering in molds, to give self-extinguishing moldings or extrudates. Not only do the products have very good flameproof characteristics, but the flameproofing agent is also highly migration-resistant. The molding compositions can be processed on conventional machinery without resulting in adverse side effects, e.g. corrosion or the formation of a coating, and give finished articles having good mechanical properties.

The Examples which follow illustrate the invention. In the Examples, parts and percentages are by weight, unless stated otherwise.

EXAMPLE

To manufacture the flameproofed molding compositions, an ABS polymer comprising (A) 30 parts of a graft product produced by emulsion polymerization of from 40% of a 70:30 styrene/acrylonitrile mixture and 60% of polybutadiene, and (B) 70 parts of a styrene-acrylonitrile copolymer was used. The flameproofing agents employed were brominated styrene oligomers of the general formula (I), with bromine contents of from 60 to 70% and varying degrees of polymerization. The synergistic flameproofing agent was antimony trioxide. The ABS polymer was mixed with the brominated styrene oligomers and the antimony trioxide and the mixture was melted in an extruder at from 180° to 250° C., extruded and granulated. The granules obtained were then converted to the test specimens, required for the various tests, on an injection molding machine at from 200° to 280° C.

The burning characteristics of the test specimens were determined by the method of ASTM D-2863-70. In the Table which follows, the oxygen index ($n_2$) is given as a measure of these charateristics. The impact strength $a_n$ was determined by the method of DIN 53,453. The melt index $MI_{21.6}$ was measured by the method of DIN 53,735. The comparative assessment of the migration of the flameproofing agent from the finished articles was carried out both in a tropical chamber at from 40° to 60° C. and from 90 to 100% relative humidity, with a test duration of from 24 to 200 hours, and in a drying cabinet at 60° C., with the same duration. The formation of a coating on the finished articles was assessed at the end of the test.

For comparative purposes, the ABS polymer was compounded with nonabromodiphenyl as the flameproofing agent, and tested, using the same methods.

The results of the individual experiments are listed in the Table which follows. Experiments No. 1 to 6 are in accordance with the invention and Experiment No. 7 was carried out for comparison.

TABLE

| Experiment No. | Flameproofing agent Type | Degree of polymerization [1] | Bromine content in the ABS (%) | Sb content in the ABS (%) | $n_2$ | Migration | $a_n$ (kJ/m$^2$) | $MI_{21.6}$ |
|---|---|---|---|---|---|---|---|---|
| 1 | BOS[2] | 190 | 10.7 | 5.0 | 0.25 | none observed | 30 | 4.6 |
| 2 | BOS | 145 | 11.0 | 4.2 | 0.26 | none observed | 35 | 6.0 |
| 3 | BOS | 100 | 11.0 | 4.2 | 0.25 | none observed | 40 | 6.2 |
| 4 | BOS | 48 | 10.8 | 4.2 | 0.26 | none observed | 46 | 6.7 |
| 5 | BOS | 11 | 11.3 | 4.2 | 0.27 | none observed | 80 | 10 |
| 6 | BOS | 7 | 10.8 | 5.0 | 0.26 | none observed | 90 | 11 |
| 7 | nonabromodiphenyl | | 10.9 | 4.5 | 0.26 | pronounced coating | 80 | 10 |

[1] determined by vapor pressure osmometry of the non-brominated oligomers in toluene at 25° C.
[2] BOS = brominated oligostyrene

We claim:
1. A thermoplastic molding composition comprising
(A) from 6 to 100 percent by weight, based on (A+B), of a graft product manufactured by graft polymerization of
  1. from 10 to 95 percent by weight, based on (A), of a mixture of styrene and acrylonitrile or an alkyl derivative thereof in the weight ratio of from 90:10 to 60:40, in the presence of
  2. from 90 to 5 percent by weight, based on (A), of a rubbery polymer having a glass transition temperature of below 0° C.,
(B) from 0 to 94 percent by weight, based on (A+B), of a copolymer of styrene and acrylonitrile or an alkyl derivative thereof in the weight ratio of from 90:10 to 60:40, the content of the rubbery polymer (A 2) in the molding composition being from 5 to 40 percent by weight based on the sum of (A+B),
(C) from 5 to 30 percent by weight, based on the sum of (A+B), of one or more heat-stable brominated styrene oligomers which contain 40 to 80 percent by weight of bromine and which have a mean degree of polymerization of from 3 to 200 to act as a flameproofing agent, with or without
(D) further additives.

2. A thermoplastic molding composition as claimed in claim 1, wherein a synergistic flameproofing agent is present in addition to the halogenated styrene oligomers.

3. A thermoplastic molding composition as claimed in claim 2, wherein the synergistic agent is antimony trioxide.

* * * * *